United States Patent
Kizhakkepat et al.

(10) Patent No.: US 9,701,403 B2
(45) Date of Patent: Jul. 11, 2017

(54) BROAD GOODS COMPOSITE YOKE FOR ROTOR SYSTEM

(71) Applicant: Bell Helicopter Textron Inc., Fort Worth, TX (US)

(72) Inventors: Amarjit Kizhakkepat, Fort Worth, TX (US); Levi Armstrong, Saginaw, TX (US); Tyler Baldwin, Keller, TX (US); Paul Oldroyd, Azle, TX (US); Michael J. Southerland, North Richland Hills, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 122 days.

(21) Appl. No.: 14/182,370

(22) Filed: Feb. 18, 2014

(65) Prior Publication Data
US 2015/0232175 A1    Aug. 20, 2015

(51) Int. Cl.
| | | |
|---|---|---|
| *B64C 27/32* | (2006.01) | |
| *B64C 29/00* | (2006.01) | |
| *B29C 70/00* | (2006.01) | |
| *B32B 5/12* | (2006.01) | |
| *B32B 5/26* | (2006.01) | |

(52) U.S. Cl.
CPC .............. *B64C 27/32* (2013.01); *B29C 70/00* (2013.01); *B32B 5/12* (2013.01); *B32B 5/26* (2013.01); *B64C 29/0033* (2013.01); *B32B 2260/023* (2013.01); *B32B 2260/046* (2013.01); *B32B 2603/00* (2013.01); *B32B 2605/18* (2013.01); *Y10T 156/108* (2015.01)

(58) Field of Classification Search
CPC ..................................................... B64C 27/48
See application file for complete search history.

(56) References Cited

U.S. PATENT DOCUMENTS

| | | | | |
|---|---|---|---|---|
| 3,762,834 A | * | 10/1973 | Bourquardez | B64C 27/51 416/134 A |
| 4,293,276 A | * | 10/1981 | Brogdon | B64C 27/33 416/134 A |
| 4,568,245 A | * | 2/1986 | Hibyan | B64C 27/32 416/134 A |
| 4,568,246 A | * | 2/1986 | Hibyan | B64C 27/48 416/134 A |
| 4,585,393 A | * | 4/1986 | Hibyan | B64C 27/35 416/134 A |
| 4,818,179 A | * | 4/1989 | Toner | B64C 27/32 416/134 A |
| 4,898,515 A | * | 2/1990 | Beno | B29C 70/083 416/134 A |

(Continued)

OTHER PUBLICATIONS

Lalonde, Stéphanie. "Investigation into the Static and Fatigue Behaviour of a Helicopter Main Rotor Yoke Made of Composite Materials." Thesis submitted to Department of Mechanical Engineering, McGill University, Montréal. Jan. 2000.*

(Continued)

*Primary Examiner* — Philip J Bonzell
*Assistant Examiner* — Michael Kreiner (57) ABSTRACT

According to one embodiment, a rotorcraft yoke comprises a plurality of arms. The plurality of arms, in combination, comprise a plurality of fibrous plies extending continuously throughout all of the plurality of arms.

19 Claims, 11 Drawing Sheets

(56) References Cited

U.S. PATENT DOCUMENTS

| | | | | |
|---|---|---|---|---|
| 5,059,094 A * | 10/1991 | Robinson | ................ | B64C 27/48 |
| | | | | 416/134 A |
| 5,091,029 A * | 2/1992 | Davis | .................... | B29C 53/564 |
| | | | | 156/169 |
| 5,284,420 A * | 2/1994 | Guimbal | ................. | B64C 27/33 |
| | | | | 416/131 |
| 6,296,444 B1 * | 10/2001 | Schellhase | .............. | B64C 27/32 |
| | | | | 416/134 A |
| 6,824,096 B2 * | 11/2004 | Zoppitelli | ............... | B64C 27/28 |
| | | | | 244/17.25 |
| 7,665,969 B2 * | 2/2010 | Stamps | ................... | B64C 27/48 |
| | | | | 416/134 A |
| 8,047,466 B2 * | 11/2011 | Stamps | ................... | B64C 27/32 |
| | | | | 244/17.25 |
| 8,257,051 B2 * | 9/2012 | Stamps | ................... | B64C 27/32 |
| | | | | 416/134 A |
| 8,956,117 B2 * | 2/2015 | Stamps | ................... | B64C 27/33 |
| | | | | 416/134 A |
| 2010/0247312 A1 * | 9/2010 | Girard | .................... | B64C 27/35 |
| | | | | 416/134 A |
| 2013/0034443 A1 * | 2/2013 | Pfaller | .................... | B64C 27/33 |
| | | | | 416/134 A |
| 2014/0322010 A1 * | 10/2014 | Rauber | ................... | B64C 27/32 |
| | | | | 416/1 |
| 2015/0034772 A1 * | 2/2015 | Foskey | ................... | B64C 27/28 |
| | | | | 244/7 A |

OTHER PUBLICATIONS

Altman, L. K., Reddy, D. J., and Moore, H., "Fail-safe Approach for the V-22 Composite Proprotor Yoke," Composite Structures: Theory and Practice, ASTM STP 1383, American Society for Testing and Materials, West Conshohocken, PA, 2000, pp. 131-139.*

"Eurocopter Star Flex Technology: Building Rotor Hubs for Light and Medium Lift Helicopters." Author unknown. <www.sldinfo.com/eurocopter-star-flex-technology-building-rotor-hubs-for-light-and-medium-lift-helicopters/>. Published Apr. 9, 2011.*

* cited by examiner

BROAD GOODS COMPOSITE YOKE FOR ROTOR SYSTEM

TECHNICAL FIELD

This invention relates generally to rotor systems, and more particularly, to a broad goods composite yoke for a rotor system.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to reduce manufacturing costs of a composite yoke. A technical advantage of one embodiment may include the capability to produce a tiltrotor composite yoke without belted-blade retention straps.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1A:
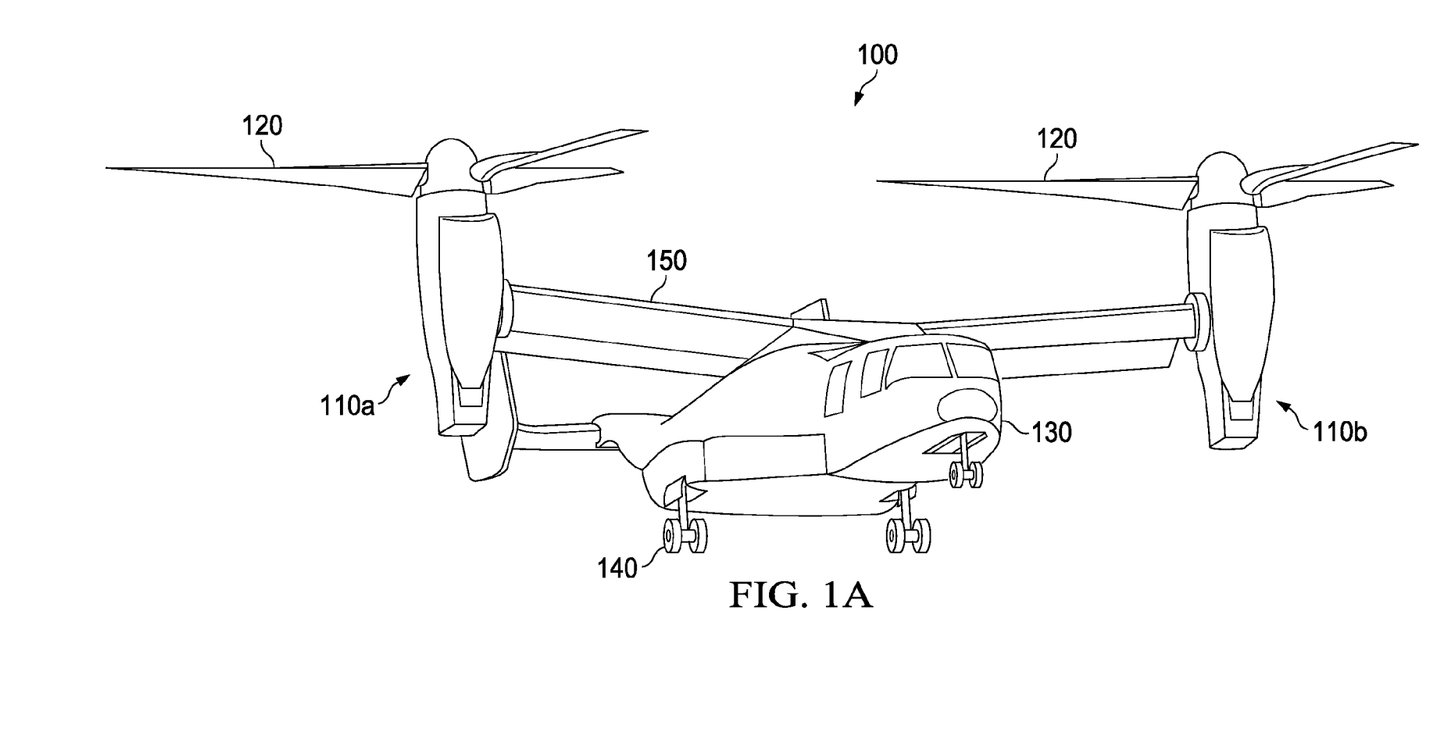
FIG. 1A shows a tiltrotor aircraft according to one example embodiment.

FIG. 1A shows a rotorcraft 100 according to one example embodiment. Rotorcraft 100 features rotor systems 110a and 110b, blades 120, a fuselage 130, a landing gear 140, and a wing 150.

Rotor system 110 may rotate blades 120. Rotor system 110 may include a control system for selectively controlling the pitch of each blade 120 in order to selectively control direction, thrust, and lift of rotorcraft 100. In the example of FIG. 1A, rotorcraft 100 represents a tiltrotor aircraft, and rotor systems 110a and 110b feature rotatable nacelles. In this example, the position of nacelles 110a and 110b, as well as the pitch of rotor blades 120, can be selectively controlled in order to selectively control direction, thrust, and lift of tiltrotor aircraft 100.

Fuselage 130 represents the main body of rotorcraft 100 and may be coupled to rotor system 110 (e.g., via wing 150) such that rotor system 110 and blades 120 may move fuselage 130 through the air. Landing gear 140 supports rotorcraft 100 when rotorcraft 100 is landing and/or when rotorcraft 100 is at rest on the ground.

Teachings of certain embodiments relating to rotor systems described herein may apply to rotor system 110 and/or other rotor systems, such as non-tilting rotor and helicopter rotor systems. It should also be appreciated that teachings from rotorcraft 100 may apply to aircraft other than rotorcraft, such as airplanes and unmanned aircraft, to name a few examples.

In the example of FIG. 1A, tiltrotor aircraft 100 may operate in a helicopter mode by tilting the nacelles upright and in an airplane mode by tilting the nacelles forward. Tiltrotor aircraft 100 may generate greater forward speed in airplane mode than in helicopter mode because, in airplane mode, blades 120 are oriented to generate greater thrust propelling the aircraft forward (somewhat analogous to a propeller).

Figure 1B:
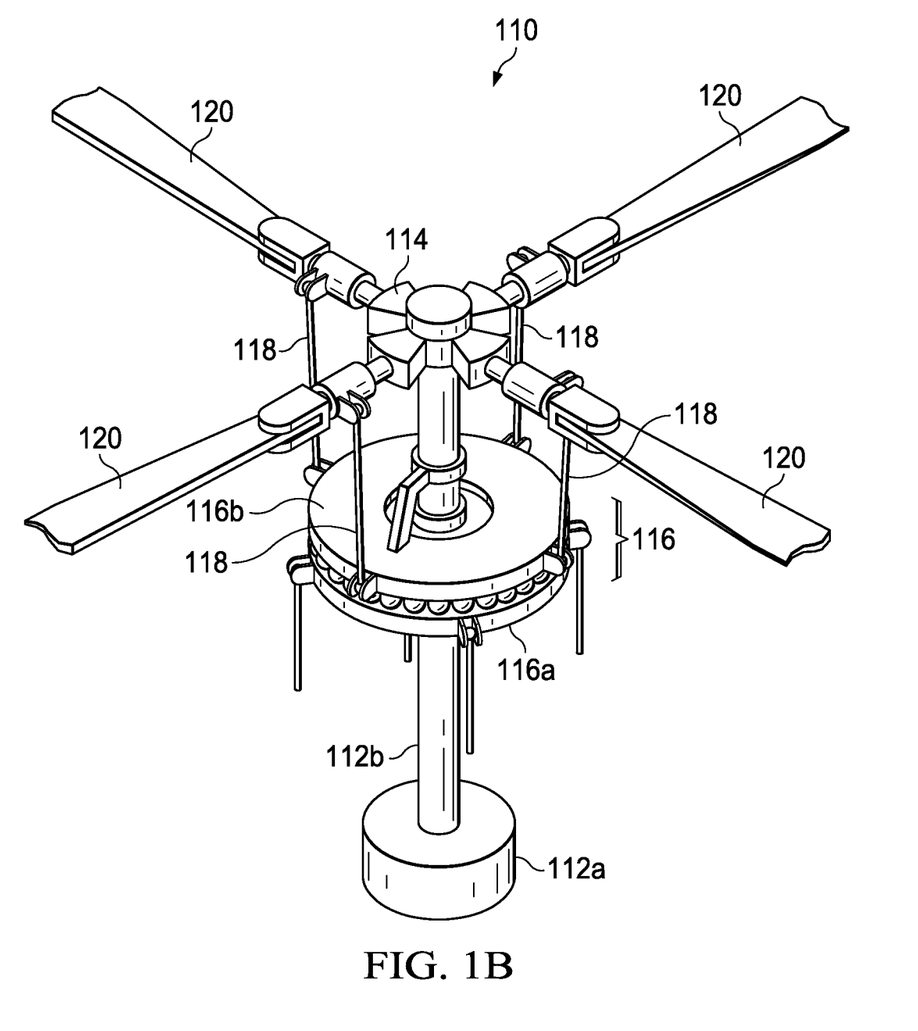
FIG. 1B shows a simplified example of a rotor system that may be incorporated in whole or in part in the rotorcraft of FIG. 1A.

FIG. 1B shows a simplified example of a rotor system 110 that may be incorporated in whole or in part in the rotorcraft 100 of FIG. 1A. In the example of FIG. 1B, rotor system 110 features a power train 112, a yoke 114, a swashplate 116, and pitch links 118. In some examples, rotor system 110 may include more or fewer components. For example, FIG. 1B does not show components such as a gearbox, drive links, drive levers, tilting devices, and other components that may be incorporated.

Power train 112 features a power source 112a and a drive shaft 112b. Power source 112a, drive shaft 112b, and yoke 114 are mechanical components for transmitting torque and/or rotation. Power train 112 may include a variety of components, including an engine, a transmission, and differentials. In operation, drive shaft 112b receives torque or rotational energy from power source 112a and rotates yoke 114. Rotation of rotor yoke 114 causes blades 120 to rotate about drive shaft 112b. In some embodiments, power train 112 may include more or fewer components. For example, in some embodiments, tilting devices may be provided in mechanical communication with power train 112 that allows certain components of rotor system 110 to tilt between helicopter mode and airplane mode.

Swashplate 116 translates rotorcraft flight control input into motion of blades 120. Because blades 120 are typically spinning when the rotorcraft is in flight, swashplate 116 may transmit flight control input from the non-rotating fuselage to the yoke 114, blades 120, and/or components coupling yoke 114 to blades 120 (e.g., grips and pitch horns). References in this description to coupling between a pitch link and a yoke may also include, but are not limited to, coupling between a pitch link and a blade or components coupling a yoke to a blade.

In some examples, swashplate 116 may include a non-rotating swashplate ring 116a and a rotating swashplate ring 116b. Non-rotating swashplate ring 116a does not rotate with drive shaft 112b, whereas rotating swashplate ring 116b does rotate with drive shaft 112*b*. In the example of FIG. 1B, pitch links 118 connect rotating swashplate ring 116*b* to blades 120.

In operation, according to one example embodiment, translating the non-rotating swashplate ring 116*a* along the axis of drive shaft 112*b* causes the pitch links 118 to move up or down. This changes the pitch angle of all blades 120 equally, increasing or decreasing the thrust of the rotor and causing the aircraft to ascend or descend. Tilting the non-rotating swashplate ring 116*a* causes the rotating swashplate 116*b* to tilt, moving the pitch links 118 up and down cyclically as they rotate with the drive shaft. This tilts the thrust vector of the rotor, causing rotorcraft 100 to translate horizontally following the direction the swashplate is tilted.

During operation, yoke 114 and other components of rotor system 110 may be subject to a variety of forces. Examples of such forces may include, but are not limited to, flapping, coning, axial, lead/lag, and feathering forces. Such forces may cause damage to yoke 114 and other components of rotor system 110 during operation if, for example, the magnitude of the forces is too high or the motions causing such forces occur too frequently. Accordingly, teachings of certain embodiments recognize the capability to provide a yoke 114 that can withstand these and other forces.

Figure 2A:
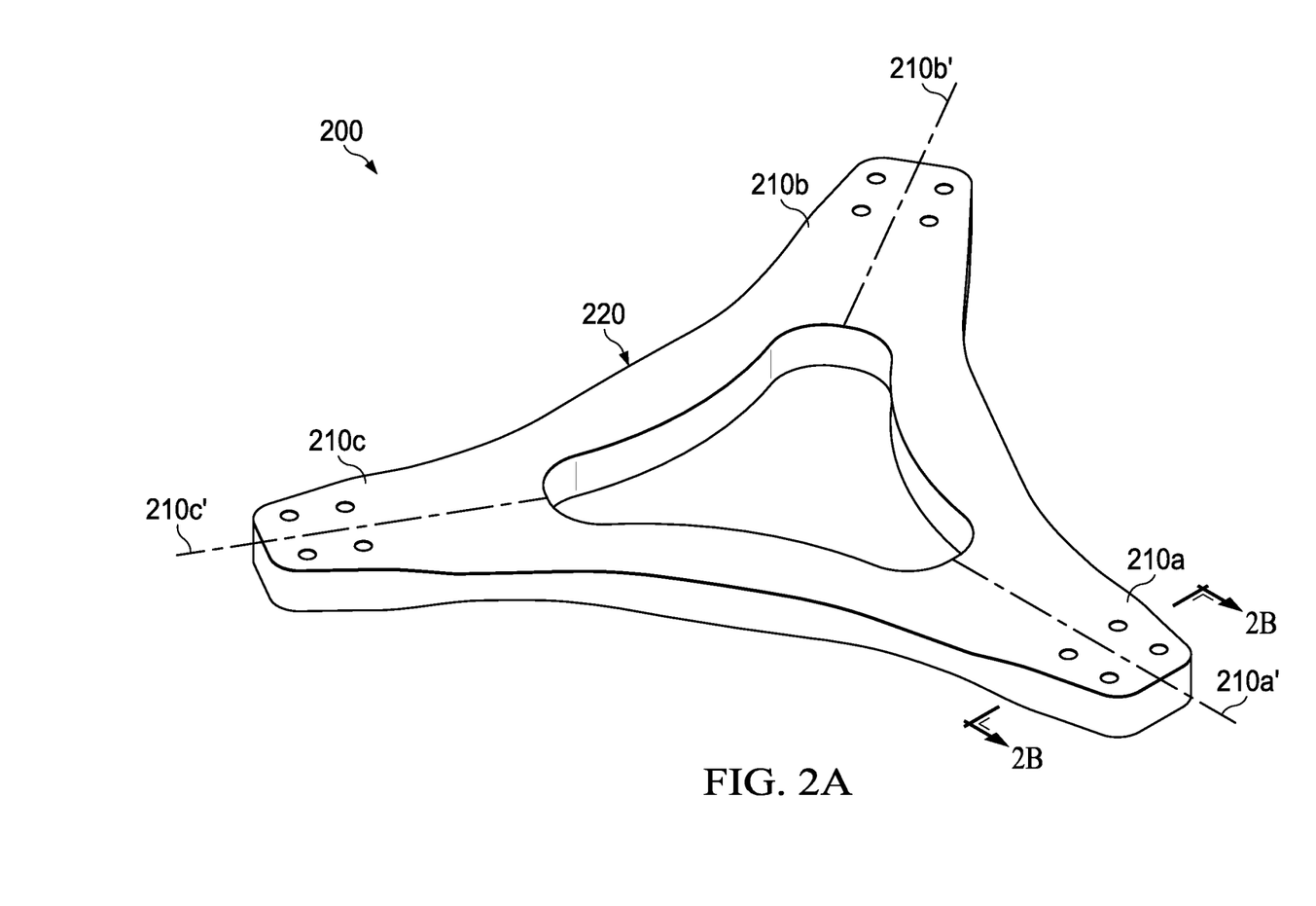
FIG. 2A shows a perspective view of a yoke.
Figure 2B:
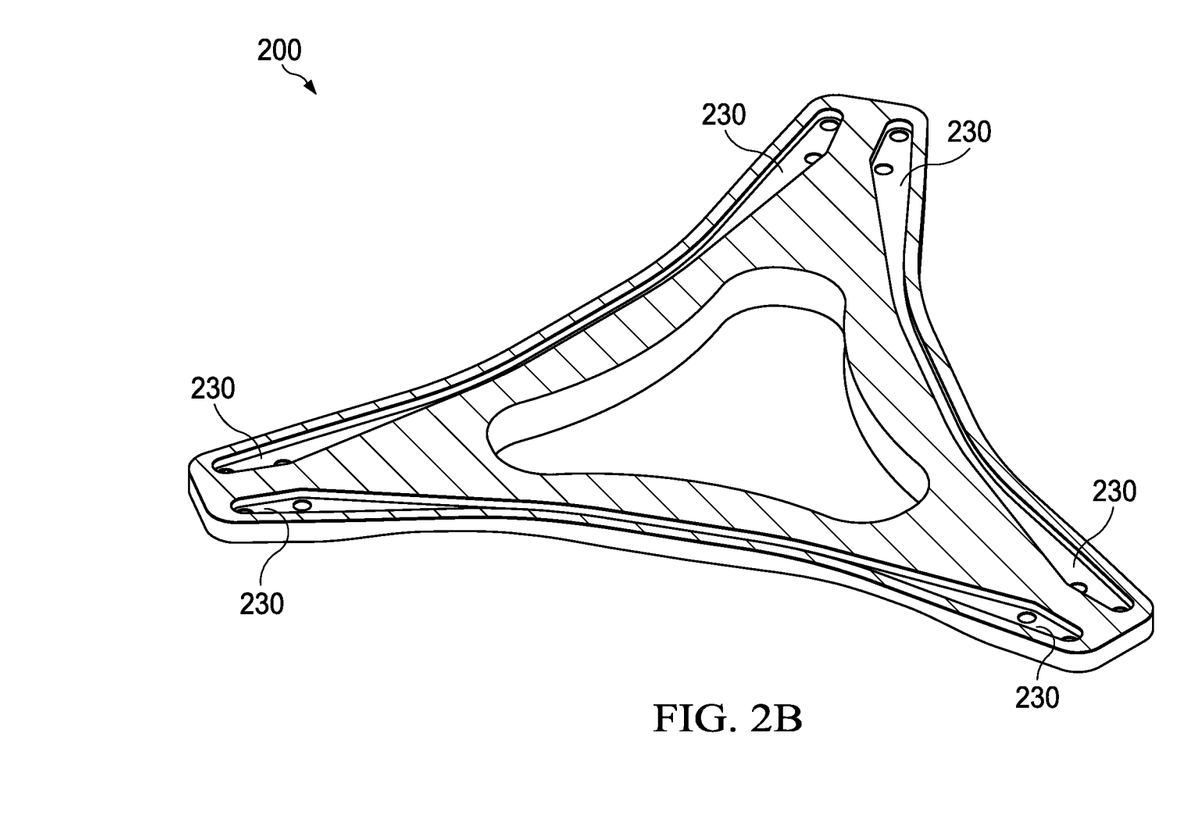
FIG. 2B shows a cross-section view of the yoke of FIG. 2A.

FIGS. 2A and 2B show a yoke 200. FIG. 2A shows a perspective view of yoke 200, and FIG. 2B shows a cross-section view of yoke 200. Yoke 200 features three arms 210*a*, 210*b*, and 210*c* oriented along corresponding axes 210*a'*, 210*b'*, and 210*c'*.

In the example of FIGS. 2A and 2B, yoke 200 represents a composite yoke. For example, as seen in FIG. 2B, yoke 200 may include several belted-blade retention straps 230. Each strap 230 may increase the strength of yoke 200 by extending from one arm to an adjacent arm. In combination, straps 230 may distribute forces across yoke 200 by transferring forces from each yoke arm to the adjacent yoke arms.

Inclusion of belted-blade retention straps 230 may result in a higher cost of manufacture. For example, as seen in FIG. 2B, each cross-section layer of yoke 200 includes three straps 230 as well as additional pieces of material arranged inside, between, and around straps 230 to complete the shape of yoke 230. In one example yoke, a single layer may include twelve pieces of material arranged inside, between, and around straps 230. The process of aligning straps 230 and arranging the additional pieces of material inside, between, and around straps 230 can be quite time-consuming and expensive even for a single layer, and this process must be repeated for each layer of yoke 200.

Accordingly, teachings of certain embodiments recognize the capability to reduce the cost of producing a composite yoke by reducing the time and pieces necessary to form each layer of the yoke. In particular, teachings of certain embodiments recognize the capability to produce a broad goods yoke that uses fewer plies of material to form each layer. Teachings of certain embodiments also recognize the capability to eliminate the needs for straps such as straps 230, which increase construction cost.

Figure 3A:
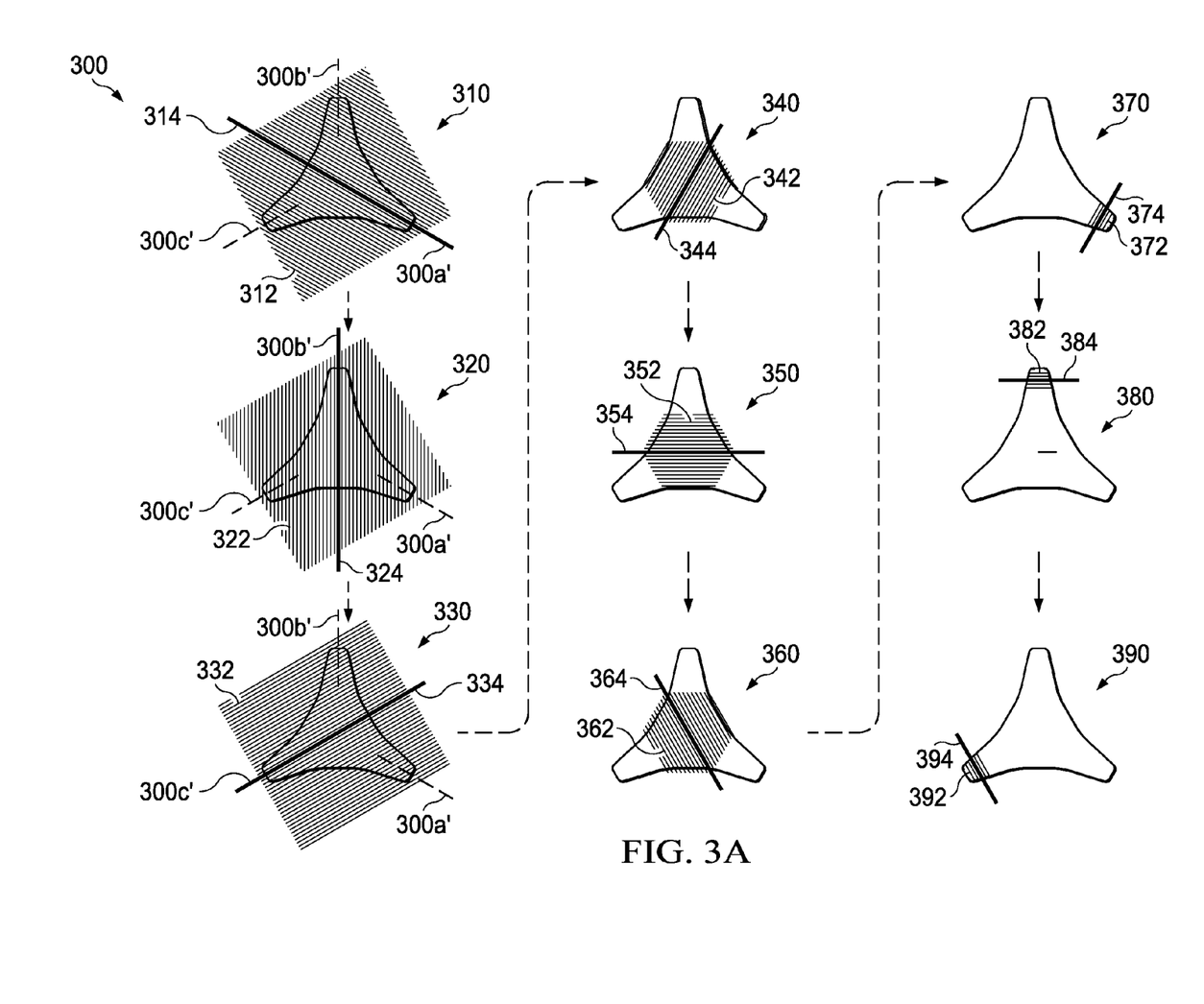
FIGS. 3A and 3B show partial layups of a yoke according to one example embodiment.
Figure 3B:
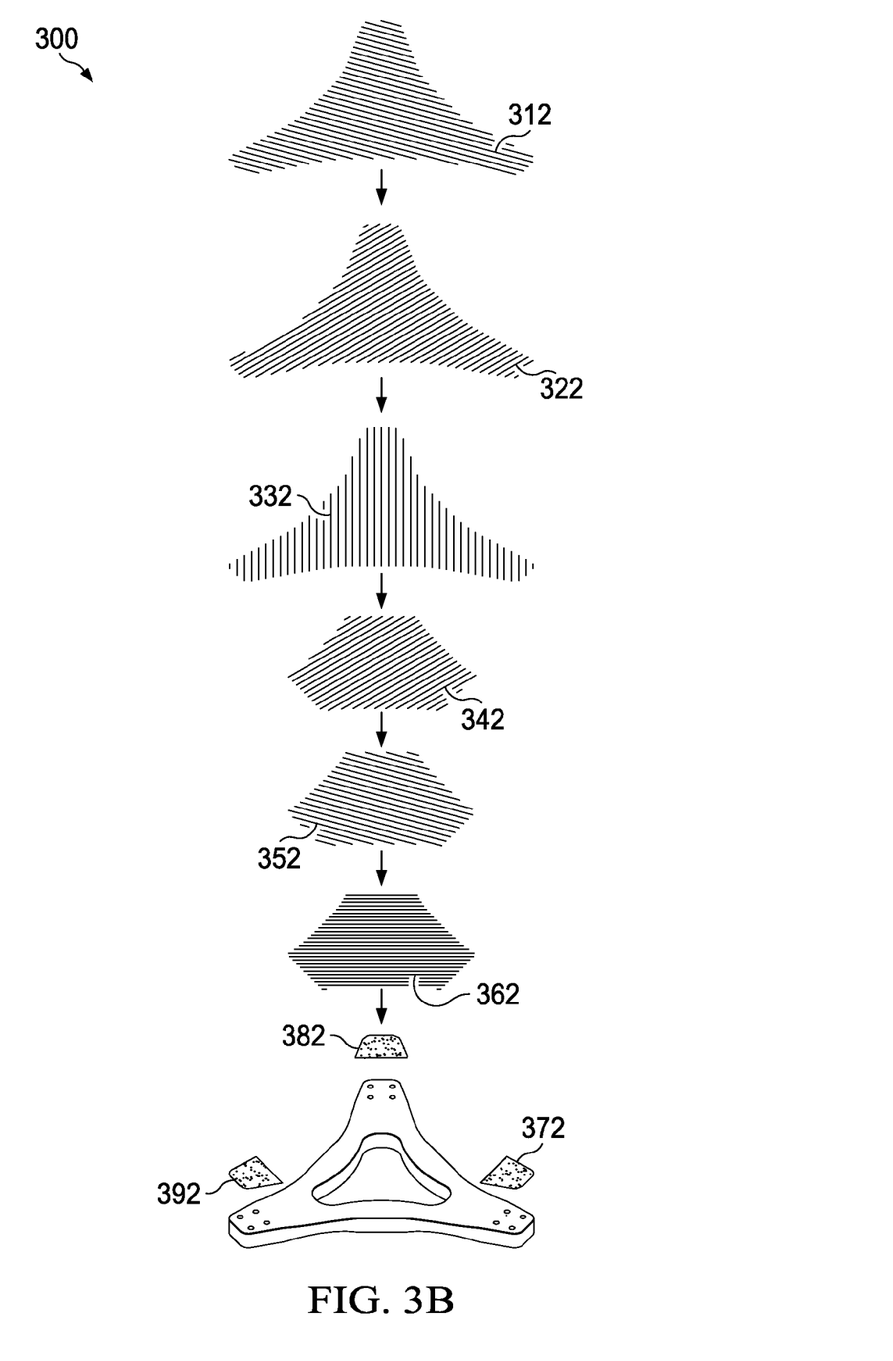

FIGS. 3A and 3B show partial layups of a yoke 300 according to one example embodiment. Yoke 300 features three arms 300*a*, 300*b*, and 300*c* oriented along corresponding axes 300*a'*, 300*b'*, and 300*c'*.

FIG. 3A shows a disassembled layup of yoke 300 in nine steps 310-390. Each step 310-390 corresponds to layup of a ply 312-392. Teachings of certain embodiments recognize that more or fewer types of plies may be used, and that each type of ply may be used more than once. FIG. 3B shows a disassembled view of the layup of plies 312-392 shown in FIG. 3A after the plies 312-392 have been trimmed to form the shape of yoke 300. Teachings of certain embodiments recognize that trimming of plies 312-392 may occur before, during, or after layup and cure.

At step 310, ply 312 is aligned in a direction that is substantially parallel to axis 300*a'* and angled relative to axes 300*b'* and 300*c'*. For example, in some embodiments, ply 312 may include a plurality of fibers 314 that are aligned in a direction that is substantially parallel to axis 300*a'* and angled relative to axes 300*b'* and 300*c'*. At step 320, ply 322 is aligned in a direction that is substantially parallel to axis 300*b'* and angled relative to axes 300*a'* and 300*c'*. For example, in some embodiments, ply 322 may include a plurality of fibers 324 that are aligned in a direction that is substantially parallel to axis 300*b'* and angled relative to axes 300*a'* and 300*c'*. At step 330, ply 332 is aligned in a direction that is substantially parallel to axis 300*c'* and angled relative to axes 300*a'* and 300*b'*. For example, in some embodiments, ply 332 may include a plurality of fibers 334 that are aligned in a direction that is substantially parallel to axis 300*c'* and angled relative to axes 300*a'* and 300*b'*.

Application of plies 312, 322, and 332 at steps 310, 320, and 330 may represent one example of a broad goods construction. In this example, each of the plies 312, 322, and 332 extend continuously across all of the arms 300*a*, 300*b*, and 300*c* such that each ply acts as the uniply on one arm and as a crossply on the other two arms. In this manner, teachings of certain embodiments recognize that broad goods construction of a yoke in this manner may reduce construction time and material count by using less pieces of material per layer (than, for example, construction of a layer of yoke 200). In one example scenario, broad goods construction may reduce construction time and material count by reducing ply count from over 2700 in yoke 200 to less than 1000 in yoke 300.

In addition, broad goods construction of yoke 300 may result in a surprisingly strong yoke 300. Although broad goods construction may require trimming plies (and thus cutting fibers) in order to form the final shape, teachings of certain embodiments recognize that yoke 300 may be sufficiently strong despite the cut fibers. In addition, toughened resin and improvements in resin technology to reduce resin flow and changes in thickness may improve construction of a broad goods yoke. Furthermore, although straps such as straps 230 may increase the strength of a yoke such as yoke 200, teachings of certain embodiments recognize that broad goods construction may result in a yoke strong enough to eliminate the need for straps such as straps 230. Thus, although some might conclude that a broad goods construction may result in a weak yoke, testing and analysis suggests that a broad goods yoke may have sufficient strength and fatigue durability to be used operationally.

Although broad goods construction may result in a surprisingly strong yoke, teachings of certain embodiments recognize the capability to improve yoke strength in specific areas by providing additional layers of plies that do not extend continuously across all of the arms 300*a*, 300*b*, and 300*c*. For example, the central portion of yoke 300 may be reinforced at steps 340-360. In these steps, plies 342, 352, and 362 are aligned in directions such that their fibers 344, 354, and 364 are angled relative to axes 300*a'*, 300*b'*, and 300*c'*. As another example, the tips of arms 300*a*, 300*b*, and 300*c* may be reinforced at steps 370-390. In these steps, plies 372, 382, and 392 are aligned in directions such that their fibers 374, 384, and 394 are at an angle to corresponding axes 300*a'*, 300*b'*, and 300*c'*.

In some embodiments, yoke 300 may be cured and trimmed after the plies are laid-up, such as described above. In one example embodiment, yoke 300 may be laid up with fiberglass material with epoxy resin. In some embodiments, some or all of the plies of yoke 300 may be laid up using an automated layup construction process. To cure, the laid-up assembly may be placed in a single-sided tool and autoclave cured. Teachings of certain embodiments recognize that such a tooling approach may reduce the need to tightly control material volume. The cured material may then be machine profiled to form the desired yoke shape.

Figure 4:
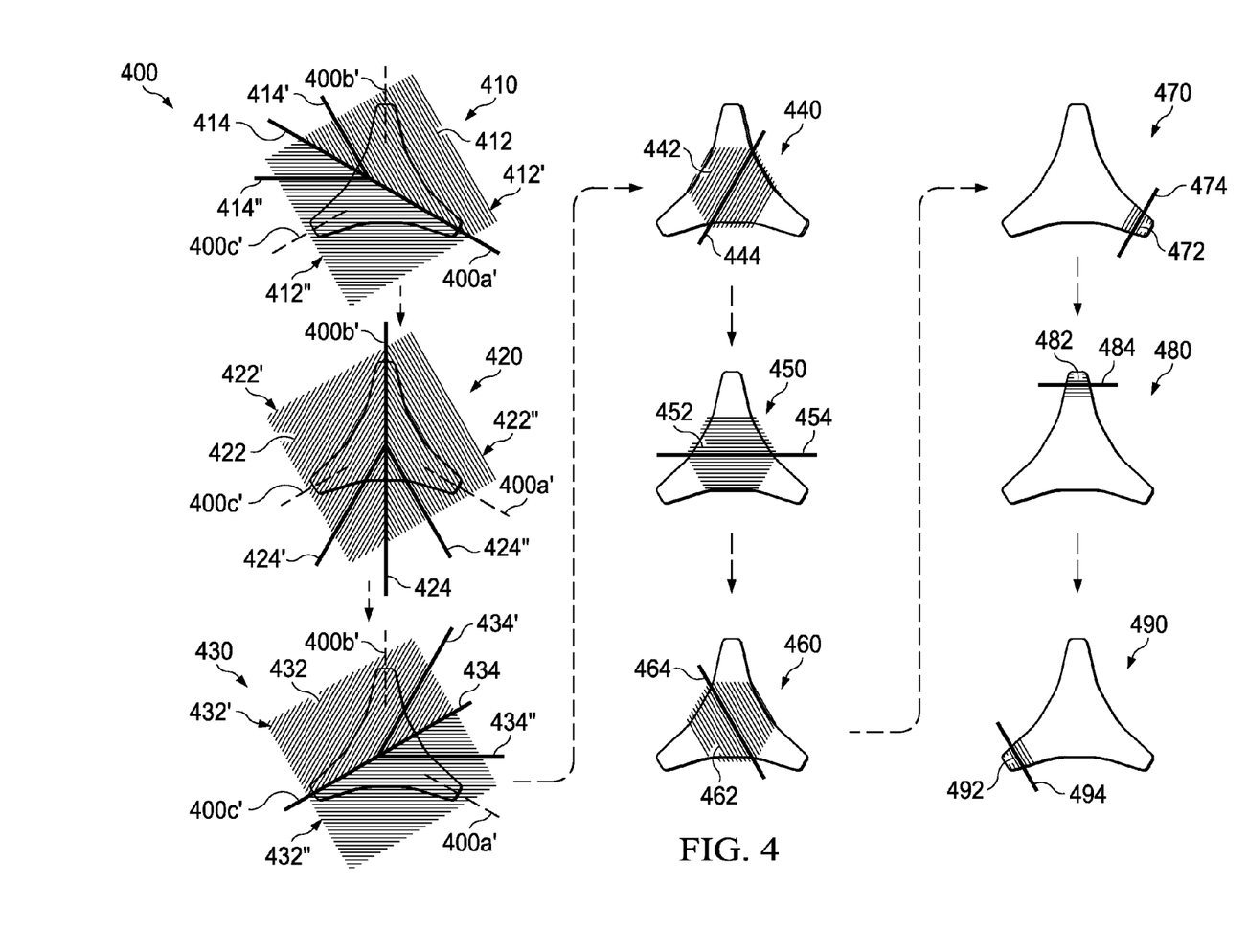
FIG. 4 shows a partial layup of a yoke according to another example embodiment.

FIG. 4 shows a disassembled layup of a yoke 400 according to another example embodiment. Yoke 400 features three arms 400a, 400b, and 400c oriented along corresponding axes 400a', 400b', and 400c'. In the example of FIG. 4, each step 410-490 corresponds to layup of a ply 412-492. Teachings of certain embodiments recognize that more or fewer types of plies may be used, and that each type of ply may be used more than once.

At step 410, ply 412 is aligned in a direction that is substantially parallel to axis 400a' and angled relative to axes 400b' and 400c'. For example, in some embodiments, ply 412 may include a first plurality of fibers 414' that are aligned at a first angle relative to axis 400a' and a second plurality of fibers 414" that are aligned at a second angle relative to axis 400a' that is different from the first angle. In the example of FIG. 4, the second angle is different from the first angle in that the two angles have approximately the same value as measured from axis 400a' but extend in opposing directions relative to axis 400a'. In this example, ply 412 may extend continuously across all of the arms 400a, 400b, and 400c such that it acts as the uniply on arm 400a and as a crossply on arms 400b and 400c. This may be done to increase load transfer across the arms.

At step 420, ply 422 is aligned in a direction that is substantially parallel to axis 400b' and angled relative to axes 400a' and 400c'. For example, in some embodiments, ply 422 may include a first plurality of fibers 424' that are aligned at a first angle relative to axis 400b' and a second plurality of fibers 424" that are aligned at a second angle relative to axis 400b' that is different from the first angle. In the example of FIG. 4, the second angle is different from the first angle in that the two angles have approximately the same value as measured from axis 400b' but extend in opposing directions relative to axis 400b'. In this example, ply 422 may extend continuously across all of the arms 400a, 400b, and 400c such that it acts as the uniply on arm 400b and as a crossply on arms 400a and 400c. This may be done to increase load transfer across the arms.

At step 430, ply 432 is aligned in a direction that is substantially parallel to axis 400c' and angled relative to axes 400a' and 400b'. For example, in some embodiments, ply 432 may include a first plurality of fibers 434' that are aligned at a first angle relative to axis 400c' and a second plurality of fibers 434" that are aligned at a second angle relative to axis 400c' that is different from the first angle. In the example of FIG. 4, the second angle is different from the first angle in that the two angles have approximately the same value as measured from axis 400c' but extend in opposing directions relative to axis 400c'. In this example, ply 432 may extend continuously across all of the arms 400a, 400b, and 400c such that it acts as the uniply on arm 400c and as a crossply on arms 400a and 400b. This may be done to increase load transfer across the arms.

Yoke 400 may also include additional layers of plies that do not extend continuously across all of the arms 400a, 400b, and 400c. For example, the central portion of yoke 400 may be reinforced at steps 440-460. In these steps, plies 442, 452, and 462 are aligned in directions such that their fibers 444, 454, and 464 are angled relative to axes 400a', 400b', and 400c'. As another example, the tips of arms 400a, 400b, and 400c may be reinforced at steps 470-490. In these steps, plies 472, 482, and 492 are aligned in directions such that their fibers 474, 484, and 494 are at an angle to corresponding axes 400a', 400b', and 400c'.

Figure 5:
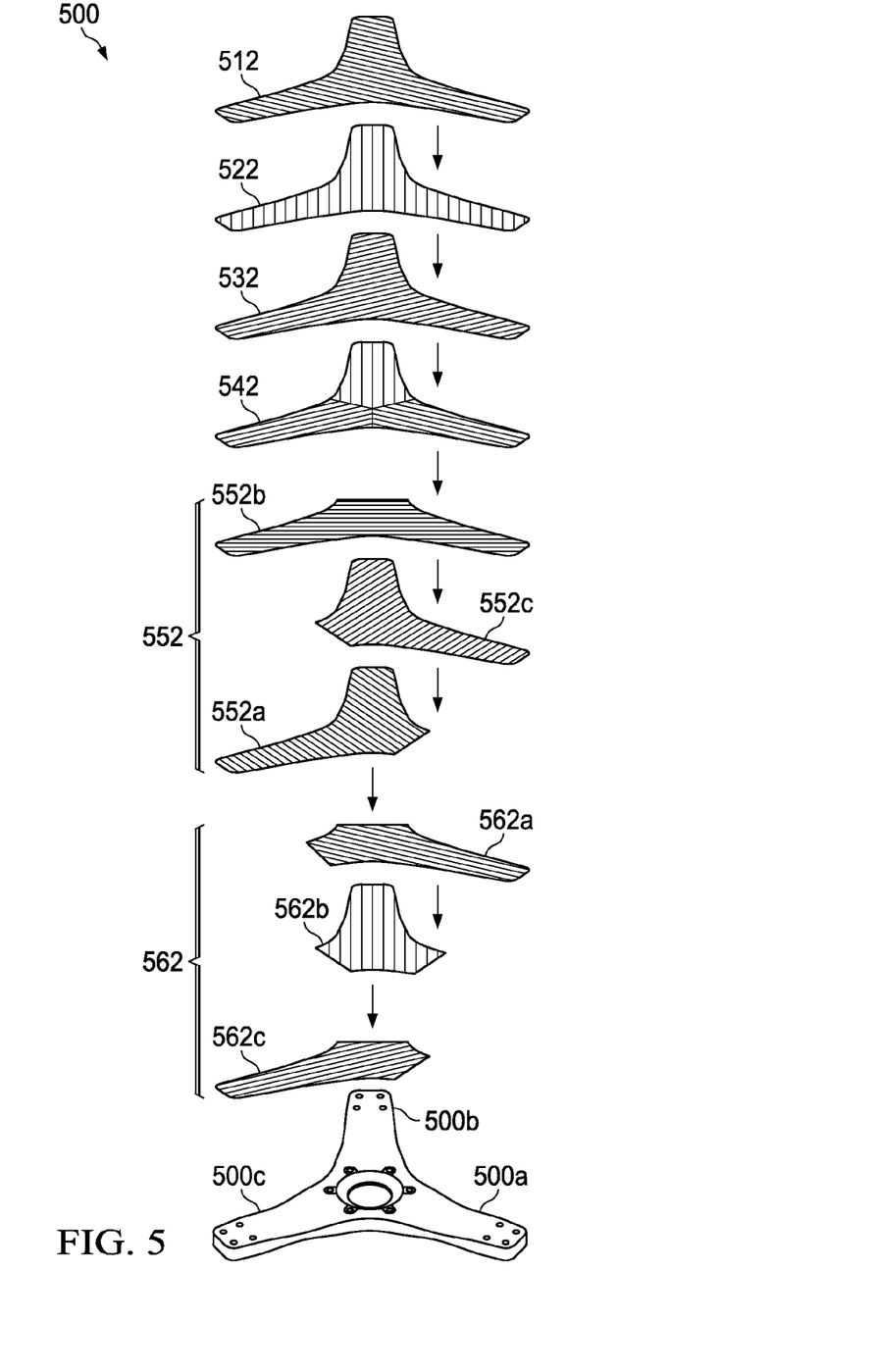
FIG. 5 shows a disassembled view of the layup of yoke 500 according to another example embodiment.

FIG. 5 shows a disassembled view of the layup of yoke 500 according to another example embodiment. In the example embodiment of FIG. 5, yoke 500 features plies 512 through 562. Teachings of certain embodiments recognize that more or fewer types of plies may be used, and that each type of ply may be used more than once. Teachings of certain embodiments also recognize that trimming of plies 512-562 may occur before, during, or after layup and cure.

In the example of FIG. 5, ply 512 is aligned in a direction that is substantially parallel to the axis of arm 500a and angled at approximately 60 degrees relative to the axes of arms 500b and 500c. For example, in some embodiments, ply 512 may include a plurality of fibers that are aligned in a direction that is substantially parallel to the axis of arm 500a and angled at approximately 60 degrees relative to the axes of arms 500b and 500c. Also in this example, ply 522 is aligned in a direction that is substantially parallel to the axis of arm 500b and angled at approximately 60 degrees relative to the axes of arms 500a and 500c. For example, in some embodiments, ply 522 may include a plurality of fibers that are aligned in a direction that is substantially parallel to the axis of arm 500b and angled at approximately 60 degrees relative to the axes of arms 500a and 500c. In addition, ply 532 is aligned in a direction that is substantially parallel to the axis of arm 500c and angled at approximately 60 degrees relative to the axes of arms 500a and 500b. For example, in some embodiments, ply 532 may include a plurality of fibers that are aligned in a direction that is substantially parallel to the axis of arm 500c and angled at approximately 60 degrees relative to the axes of arms 500a and 500b.

Application of plies 512, 522, and 532 may represent one example of a broad goods construction. In this example, each of the plies 512, 522, and 532 extend continuously across all of the arms 500a, 500b, and 500c such that each ply acts as the uniply on one arm and as a crossply on the other two arms. In this manner, teachings of certain embodiments recognize that broad goods construction of a yoke in this manner may reduce construction time and material count by using less pieces of material per layer (than, for example, construction of a layer of yoke 200).

In addition to providing single-direction broadgoods plies like plies 512, 522, and 532, teachings of certain embodiments recognize the ability to provide broadgoods plies having fibers in multiple directions. For example, ply 542 features three fiber sections, each section having fibers that are aligned in a direction that is substantially parallel to the axis of a corresponding arm of yoke 500. Thus, in this example, the fibers of ply 542 may act as unidirectional plies for each arm.

Although broad goods construction may result in a surprisingly strong yoke, teachings of certain embodiments recognize the capability to improve yoke strength in specific areas by providing additional layers of plies that do not extend continuously across all of the arms 500a, 500b, and 500c. For example, the central portion of yoke 500 may be reinforced by providing sets of plies 552 and 562. Teachings of certain embodiments recognize that providing sets of plies such as sets 552 and 562 may allow for fewer butt splices & ply terminations in the center section and for better load transfer across arms.

In the example of FIG. 5, set of plies 552 includes plies 552a, 552b, and 552c. Ply 552a extends over arms 500b and 500c at an angle relative to the axes of arms 500b and 500c but does not extend continuously across all of arm 500a. Ply 552b extends over arms 500a and 500c at an angle relative to the axes of arms 500a and 500c but does not extend continuously across all of arm 500b. Ply 552c extends over arms 500a and 500b at an angle relative to the axes of arms 500a and 500b but does not extend continuously across all of arm 500c.

Also in the example of FIG. 5, set of plies 562 includes plies 562a, 562b, and 562c. Ply 562a is aligned in a direction that is substantially parallel (but may not necessarily be parallel) to the axis of arm 500a and at an angle relative to the axes of arms 500b and 500c but does not extend continuously across all of arms 500b and 500c. Ply 562b is aligned in a direction that is substantially parallel (but may not necessarily be parallel) to the axis of arm 500b and at an angle relative to the axes of arms 500a and 500c but does not extend continuously across all of arms 500a and 500c. Ply 562c is aligned in a direction that is substantially parallel (but may not necessarily be parallel) to the axis of arm 500c and at an angle relative to the axes of arms 500a and 500b but does not extend continuously across all of arms 500a and 500b.

In some embodiments, yokes may include more, fewer, or different plies than those described herein. For example, in one embodiment, a yoke may feature a combination of plies 312-392, plies 412-492, and plies 512-562.

Figure 6A:
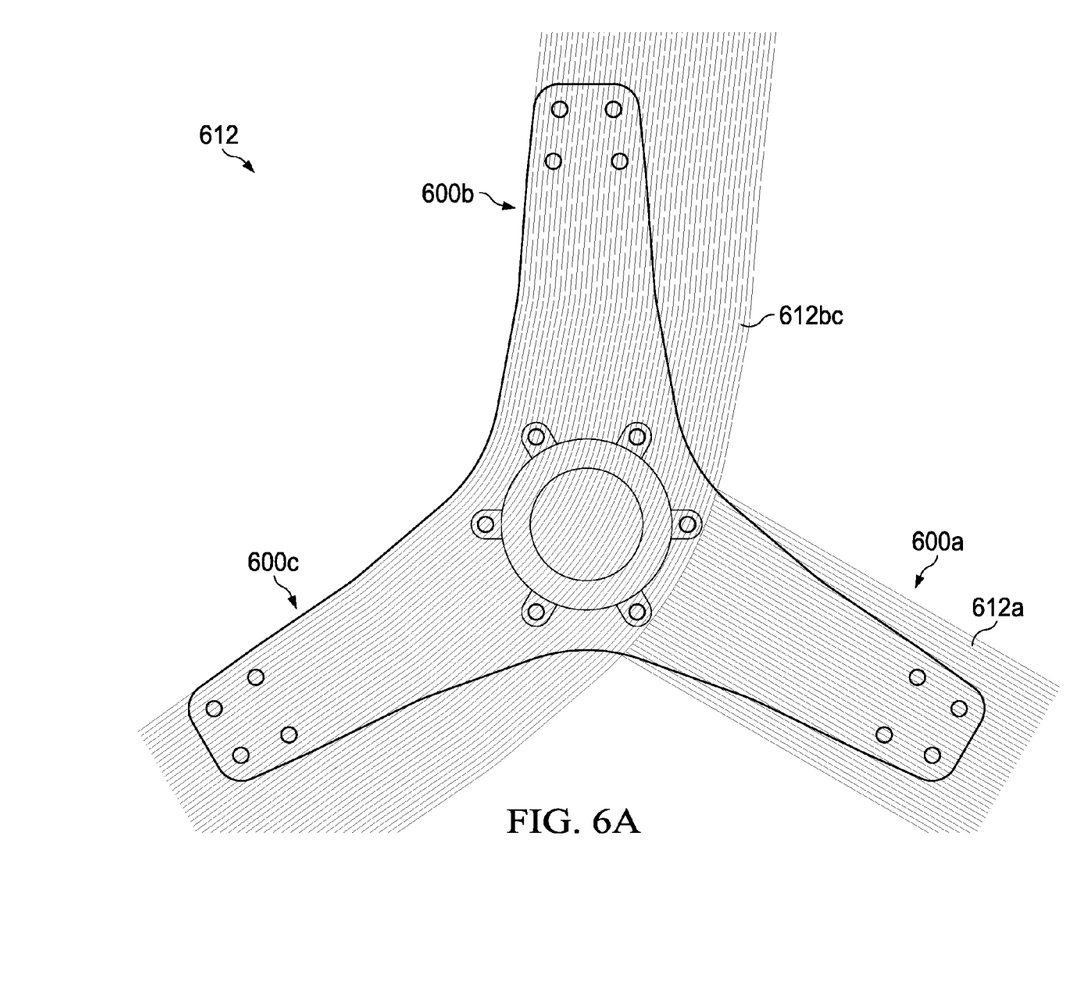
FIGS. 6A, 6B, and 6C show example plies according to one example embodiment.
Figure 6B:
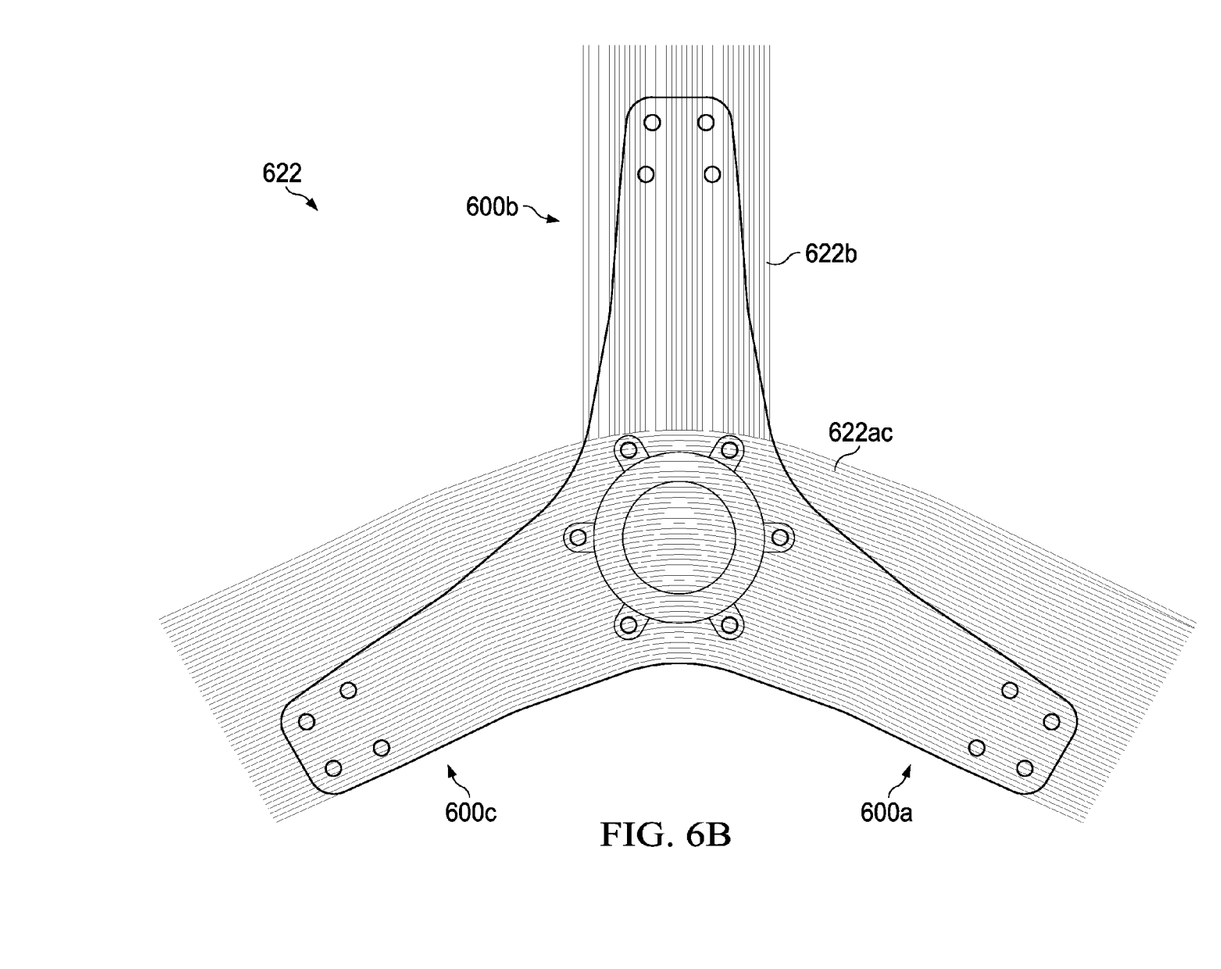
Figure 6C:
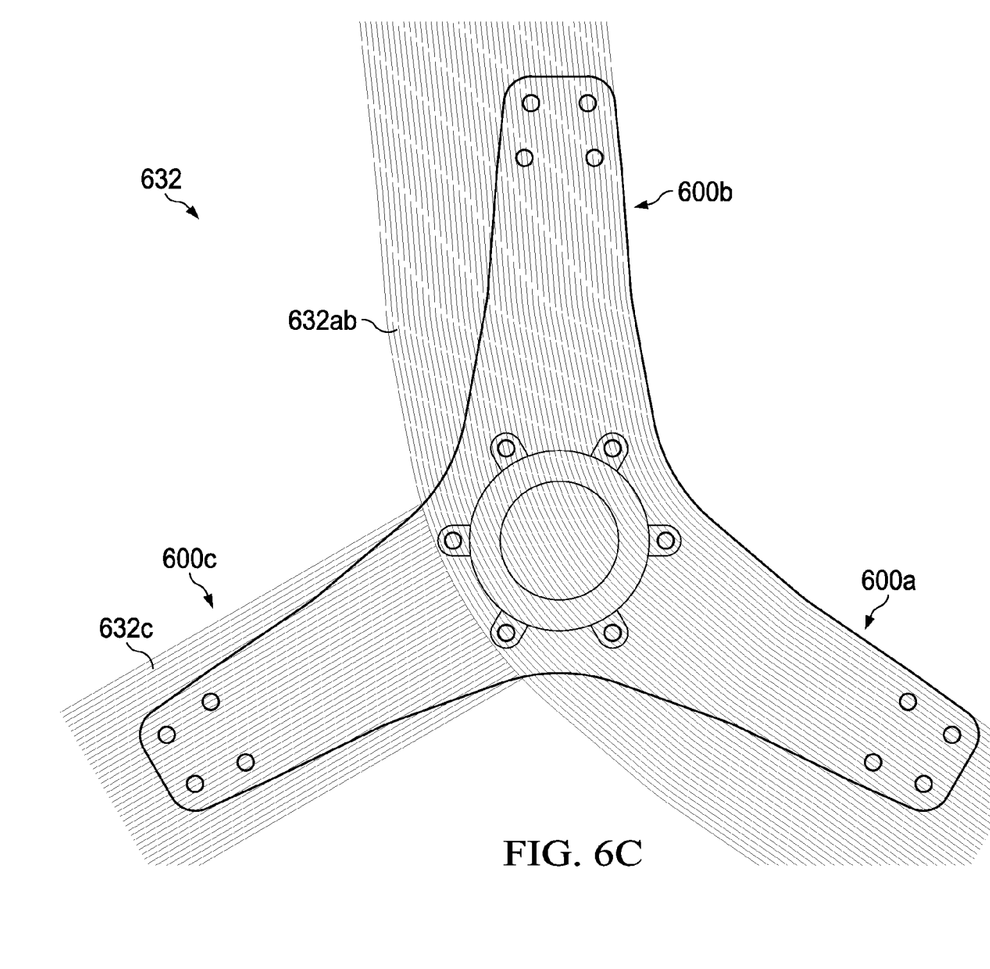

In addition, a yoke may feature other plies in addition to or in place of some or all of plies 312-392, plies 412-492, and plies 512-562. As one example, FIGS. 6A, 6B, and 6C show example plies 612, 622, and 632 according to one example embodiment. Teachings of certain embodiments recognize that the combination of plies 612, 622, and 632 may eliminate some cut fibers on primary load carrying fibers and improve load transfer between arms. Teachings of certain embodiments recognize, however, that application of such plies may require modified tooling.

In the example of FIG. 6A, ply 612 features fibrous portions 612a and 612bc. Fibrous portion 612a may include a plurality of fibers that are aligned in a direction that is substantially parallel to the axis of arm 600a. Fibrous portion 612bc may include a plurality of fibers that curve continuously across arms 600b and 600c. In the example of FIG. 6B, ply 622 features fibrous portions 622b and 622ac. Fibrous portion 622b may include a plurality of fibers that are aligned in a direction that is substantially parallel to the axis of arm 600b. Fibrous portion 622ac may include a plurality of fibers that curve continuously across arms 600a and 600c. In the example of FIG. 6C, ply 632 features fibrous portions 632c and 632ab. Fibrous portion 632c may include a plurality of fibers that are aligned in a direction that is substantially parallel to the axis of arm 600c. Fibrous portion 632ab may include a plurality of fibers that curve continuously across arms 600a and 600b.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A tiltrotor aircraft, comprising:
   a body;
   a wing member;
   a power train coupled to the body and comprising a power source and a drive shaft in mechanical communication with the power source;
   a plurality of rotor blades comprising a first rotor blade, a second rotor blade, and a third rotor blade; and
   a rotor system coupled to the wing member and in mechanical communication with the drive shaft, at least part of the rotor system being tiltable between a helicopter mode position and an airplane mode position, the rotor system comprising a yoke coupled between the drive shaft and the plurality of rotor blades, wherein:
   the yoke comprises a plurality of arms corresponding in number to the plurality of rotor blades, the plurality of arms comprising a first arm oriented along a first axis and coupled to the first rotor blade, a second arm oriented along a second axis and coupled to the second rotor blade, and a third arm oriented along a third axis and coupled to the third rotor blade; and
   the plurality of arms, in combination, comprises:
      a first plurality of fibrous plies, each fibrous ply of the first plurality of fibrous plies extending continuously throughout all of the plurality of arms, each fibrous ply of the first plurality of fibrous plies comprising a plurality of fibers aligned in a direction that is substantially parallel to the first axis;
      a second plurality of fibrous plies, each fibrous ply of the second plurality of fibrous plies extending continuously throughout all of the plurality of arms, each fibrous ply of the second plurality of fibrous plies comprising a plurality of fibers aligned in a direction that is substantially parallel to the second axis; and
      a third plurality of fibrous plies, each fibrous ply of the third plurality of fibrous plies extending continuously throughout all of the plurality of arms, each fibrous ply of the third plurality of fibrous plies comprising a plurality of fibers aligned in a direction that is substantially parallel to the third axis.

2. The tiltrotor aircraft of claim 1, wherein the plurality of fibers of the first plurality of fibrous plies extend continuously from one edge of the yoke to an opposing edge of the yoke.

3. The tiltrotor aircraft of claim 1, wherein the plurality of arms, in combination, further comprises:
   a fourth plurality of fibrous plies, each fibrous ply of the fourth plurality of fibrous plies extending continuously throughout all of the plurality of arms, each fibrous ply of the fourth plurality of fibrous plies comprising a first plurality of fibers aligned in a first direction at a first angle relative to the first axis and a second plurality of fibers aligned in a second direction at a second angle relative to the first axis, the first direction different from the second direction;

a fifth plurality of fibrous plies, each fibrous ply of the fifth plurality of fibrous plies extending continuously throughout all of the plurality of arms, each fibrous ply of the fifth plurality of fibrous plies comprising a first plurality of fibers aligned in a first direction at a first angle relative to the second axis and a second plurality of fibers aligned in a second direction at a second angle relative to the second axis, the first direction different from the second direction; and a sixth plurality of fibrous plies, each fibrous ply of the sixth plurality of fibrous plies extending continuously throughout all of the plurality of arms, each fibrous ply of the sixth plurality of fibrous plies comprising a first plurality of fibers aligned in a first direction at a first angle relative to the third axis and a second plurality of fibers aligned in a second direction at a second angle relative to the third axis, the first direction different from the second direction.

4. The tiltrotor aircraft of claim 1, wherein every fibrous ply of the yoke extends continuously throughout all of the plurality of arms.

5. A yoke comprising:
a plurality of arms, the plurality of arms comprising a first arm oriented along a first axis, a second arm oriented along a second axis, and a third arm oriented along a third axis, wherein the plurality of arms, in combination, comprises:
a first plurality of fibrous plies, each fibrous ply of the first plurality of fibrous plies extending continuously throughout all of the plurality of arms, each fibrous ply of the first plurality of fibrous plies aligned in a direction that is substantially parallel to the first axis;
a second plurality of fibrous plies, each fibrous ply of the second plurality of fibrous plies extending continuously throughout all of the plurality of arms, each fibrous ply of the second plurality of fibrous plies aligned in a direction that is substantially parallel to the second axis; and
a third plurality of fibrous plies, each fibrous ply of the third plurality of fibrous plies extending continuously throughout all of the plurality of arms, each fibrous ply of the third plurality of fibrous plies aligned in a direction that is substantially parallel to the third axis.

6. The yoke of claim 5, wherein:
each fibrous ply of the first plurality of fibrous plies comprises a plurality of fibers aligned in a direction that is substantially parallel to the first axis;
each fibrous ply of the second plurality of fibrous plies comprises a plurality of fibers aligned in a direction that is substantially parallel to the second axis; and
each fibrous ply of the third plurality of fibrous plies comprises a plurality of fibers aligned in a direction that is substantially parallel to the third axis.

7. The yoke of claim 6, wherein the plurality of fibers of the first plurality of fibrous plies extend continuously from one edge of the yoke to an opposing edge of the yoke.

8. The yoke of claim 6, wherein the plurality of arms, in combination, further comprises:
a fourth plurality of fibrous plies, each fibrous ply of the fourth plurality of fibrous plies extending continuously throughout all of the plurality of arms, each fibrous ply of the fourth plurality of fibrous plies comprising a first plurality of fibers aligned in a first direction at a first angle relative to the first axis and a second plurality of fibers aligned in a second direction at a second angle relative to the first axis, the first direction different from the second direction;

a fifth plurality of fibrous plies, each fibrous ply of the fifth plurality of fibrous plies extending continuously throughout all of the plurality of arms, each fibrous ply of the fifth plurality of fibrous plies comprising a first plurality of fibers aligned in a first direction at a first angle relative to the second axis and a second plurality of fibers aligned in a second direction at a second angle relative to the second axis, the first direction different from the second direction; and a sixth plurality of fibrous plies, each fibrous ply of the sixth plurality of fibrous plies extending continuously throughout all of the plurality of arms, each fibrous ply of the sixth plurality of fibrous plies comprising a first plurality of fibers aligned in a first direction at a first angle relative to the third axis and a second plurality of fibers aligned in a second direction at a second angle relative to the third axis, the first direction different from the second direction.

9. The yoke of claim 5, wherein:
each fibrous ply of the first plurality of fibrous plies comprises a first plurality of fibers aligned in a first direction at a first angle relative to the first axis and a second plurality of fibers aligned in a second direction at a second angle relative to the first axis, the first direction different from the second direction;
each fibrous ply of the second plurality of fibrous plies comprises a first plurality of fibers aligned in a first direction at a first angle relative to the second axis and a second plurality of fibers aligned in a second direction at a second angle relative to the second axis, the first direction different from the second direction; and
each fibrous ply of the third plurality of fibrous plies comprises a first plurality of fibers aligned in a first direction at a first angle relative to the third axis and a second plurality of fibers aligned in a second direction at a second angle relative to the third axis, the first direction different from the second direction.

10. The yoke of claim 9, wherein the first angle of the first plurality of fibers of the first plurality of fibrous plies is substantially equal to but opposite the second angle of the second plurality of fibers of the first plurality of fibrous plies.

11. The yoke of claim 9, wherein the first axis separates the first plurality of fibers of the first plurality of fibrous plies from the second plurality of fibers of the first plurality of fibrous plies.

12. The yoke of claim 5, wherein the plurality of arms, in combination, further comprises:
a fourth plurality of fibrous plies, each fibrous ply of the fourth plurality of fibrous plies extending continuously throughout only two arms;
a fifth plurality of fibrous plies, each fibrous ply of the fifth plurality of fibrous plies extending continuously throughout only two arms; and
a sixth plurality of fibrous plies, each fibrous ply of the sixth plurality of fibrous plies extending continuously throughout only two arms.

13. A method of manufacturing a yoke, the yoke comprising a plurality of arms, the plurality of arms comprising a first arm oriented along a first axis, a second arm oriented along a second axis, and a third arm oriented along a third axis, the method comprising:
providing a first plurality of fibrous plies, each fibrous ply of the first plurality of fibrous plies extending continuously throughout all of the plurality of arms, each fibrous ply of the first plurality of fibrous plies aligned in a direction that is substantially parallel to the first axis;

providing a second plurality of fibrous plies, each fibrous ply of the second plurality of fibrous plies extending continuously throughout all of the plurality of arms, each fibrous ply of the second plurality of fibrous plies aligned in a direction that is substantially parallel to the second axis;

providing a third plurality of fibrous plies, each fibrous ply of the third plurality of fibrous plies extending continuously throughout all of the plurality of arms, each fibrous ply of the third plurality of fibrous plies aligned in a direction that is substantially parallel to the third axis;

curing the first, second, and third plurality of fibrous plies with a resin to form a cured material; and cutting excess material from the cured material to form the first, second, and third arms.

14. The method of claim 13, wherein curing the first, second, and third plurality of fibrous plies with a resin to form a cured material comprises curing the first, second, and third plurality of fibrous plies in an autoclave.

15. The method of claim 13, wherein:
each fibrous ply of the first plurality of fibrous plies comprises a plurality of fibers that are aligned in a direction that is substantially parallel to the first axis;
each fibrous ply of the second plurality of fibrous plies comprises a plurality of fibers that are aligned in a direction that is substantially parallel to the second axis; and
each fibrous ply of the third plurality of fibrous plies comprises a plurality of fibers that are aligned in a direction that is substantially parallel to the third axis.

16. The method of claim 15, wherein the plurality of fibers of the first plurality of fibrous plies extend continuously from one edge of the yoke to an opposing edge of the yoke.

17. A tiltrotor aircraft, comprising:
a body;
a wing member;
a power train coupled to the body and comprising a power source and a drive shaft in mechanical communication with the power source;
a plurality of rotor blades comprising a first rotor blade, a second rotor blade, and a third rotor blade; and
a rotor system coupled to the wing member and in mechanical communication with the drive shaft, at least part of the rotor system being tiltable between a helicopter mode position and an airplane mode position, the rotor system comprising a yoke coupled between the drive shaft and the plurality of rotor blades, wherein:
the yoke comprises a plurality of arms corresponding in number to the plurality of rotor blades, the plurality of arms comprising a first arm oriented along a first axis and coupled to the first rotor blade, a second arm oriented along a second axis and coupled to the second rotor blade, and a third arm oriented along a third axis and coupled to the third rotor blade; and
the plurality of arms, in combination, comprises:
a first plurality of fibrous plies, each fibrous ply of the first plurality of fibrous plies extending continuously throughout all of the plurality of arms, each fibrous ply of the first plurality of fibrous plies comprising a first plurality of fibers aligned in a first direction at a first angle relative to the first axis and a second plurality of fibers aligned in a second direction at a second angle relative to the first axis, the first direction different from the second direction;
a second plurality of fibrous plies, each fibrous ply of the second plurality of fibrous plies extending continuously throughout all of the plurality of arms, each fibrous ply of the second plurality of fibrous plies comprising a first plurality of fibers aligned in a first direction at a first angle relative to the second axis and a second plurality of fibers aligned in a second direction at a second angle relative to the second axis, the first direction different from the second direction; and
a third plurality of fibrous plies, each fibrous ply of the third plurality of fibrous plies extending continuously throughout all of the plurality of arms, each fibrous ply of the third plurality of fibrous plies comprising a first plurality of fibers aligned in a first direction at a first angle relative to the third axis and a second plurality of fibers aligned in a second direction at a second angle relative to the third axis, the first direction different from the second direction.

18. The tiltrotor aircraft of claim 17, wherein the first angle of the first plurality of fibers of the first plurality of fibrous plies is substantially equal to but opposite the second angle of the second plurality of fibers of the first plurality of fibrous plies.

19. The tiltrotor aircraft of claim 17, wherein the first axis separates the first plurality of fibers of the first plurality of fibrous plies from the second plurality of fibers of the first plurality of fibrous plies.

* * * * *